US007466319B1

(12) United States Patent
Kirkland et al.

(10) Patent No.: US 7,466,319 B1
(45) Date of Patent: Dec. 16, 2008

(54) SYSTEM AND METHOD FOR FAST GRADIENT PIXEL CLEARS IN GRAPHICS RENDERING

(75) Inventors: Dale L. Kirkland, Madison, AL (US); James L. Deming, Madison, AL (US); William C. McKnight, Harvest, AL (US)

(73) Assignee: 3DLABS, Reid Hall Hamilton (BM)

( * ) Notice: Subject to any disclaimer, the term of this patent is extended or adjusted under 35 U.S.C. 154(b) by 1288 days.

(21) Appl. No.: 10/163,793

(22) Filed: Jun. 6, 2002

Related U.S. Application Data

(60) Provisional application No. 60/346,557, filed on Jan. 8, 2002.

(51) Int. Cl.

| | |
|---|---|
| ***G09G 5/00*** | (2006.01) |
| ***G09G 5/02*** | (2006.01) |
| ***G06K 9/36*** | (2006.01) |
| ***G06K 9/40*** | (2006.01) |
| ***G06F 12/06*** | (2006.01) |

(52) U.S. Cl. ........................ 345/589; 345/581; 345/690; 345/522; 345/574; 382/254; 382/276

(58) Field of Classification Search ................. 345/418, 345/421, 426, 428, 581, 617–618, 501, 522, 345/690, 589, 204, 694, 556, 57; 382/162–167, 382/254, 274; 358/521
See application file for complete search history.

(56) References Cited

U.S. PATENT DOCUMENTS

| | | | | |
|---|---|---|---|---|
| 4,763,119 | A * | 8/1988 | Matsubara et al. | 345/619 |
| 5,224,208 | A | 6/1993 | Miller et al. | 395/125 |
| 5,594,842 | A | 1/1997 | Kaufman et al. | 395/124 |
| 5,654,732 | A * | 8/1997 | Katakura | 345/95 |
| 5,701,366 | A | 12/1997 | Ostromoukhov et al. | 382/237 |
| 6,005,583 | A | 12/1999 | Morrison | 345/430 |
| 6,233,364 | B1 * | 5/2001 | Krainiouk et al. | 382/275 |
| 2002/0141627 | A1 * | 10/2002 | Romsdahl et al. | 382/131 |
| 2008/0066129 | A1 * | 3/2008 | Katcher et al. | 725/109 |

* cited by examiner

*Primary Examiner*—Wesner Sajous
(74) *Attorney, Agent, or Firm*—Groover & Associates

(57) ABSTRACT

A system and method of maintaining a gradient in a plurality of pixels of a graphics display, such as a color or intensity gradient, where each pixel has an X coordinate, Y coordinate, and other pixel data that includes a fast-clear bit The pixels are filled on the display to create a gradient based upon the X or Y coordinates of the pixels, or a combination thereof, and when performing a pixel data operation, such as a read operation, the pixel data for a pixel with an activated fast-clear bit is ignored.

20 Claims, 4 Drawing Sheets

SYSTEM AND METHOD FOR FAST GRADIENT PIXEL CLEARS IN GRAPHICS RENDERING

CROSS-REFERENCE TO RELATED APPLICATION

This application claims the benefit of U.S. Provisional Application Ser. No. 60/346,557, filed Jan. 8, 2002, which is hereby incorporated herein by reference.

BACKGROUND OF THE INVENTION

1. Field of the Invention

The present invention generally relates to computer systems and computer graphics. More particularly, the present invention relates to a more efficient display of a gradient, such as a gradient of color or intensity, in a display comprised of a plurality of pixels.

2. Description of the Related Art

Computer graphics systems display graphical representations of objects on a two-dimensional display screen that includes a plurality of pixels. A pixel is discrete point of illumination on the display, and the collective illumination from the plurality of pixels ultimately constitutes an image on the display. Typically, the color and intensity of each pixel on the display is controlled per every refresh cycle of the display.

In the graphics rendering process, an object to be represented on the display screen is broken down into a plurality of graphics primitives. Primitives are basic components of a graphics picture and may include points, lines, vectors and polygons, such as triangles. Typically, a hardware and software graphics system is implemented to render, or draw, the graphics primitives that represent the view of one or more objects on the screen. The primitives that define the object to be rendered are provided from a host computer, which defines each primitive in terms of primitive data. For example, when the primitive is a triangle, the host computer can define the primitive in terms of the X, Y, Z coordinates of its vertices, as well as the Red, Green, and Blue (R, G, B) color values of each vertex. Rendering hardware then interpolates the primitive data to compute the specific display screen pixels that are illuminated to represent each primitive, and the R, G, B values for each pixel to enable the full color range for the pixel.

The standard method of performing the fill operation of the graphics data to the pixels is to write data to each pixel of the display. As many computer display screens have a significant number of pixels with a large amount of data for each pixel, a fill process that includes data operations on each pixel is time consuming and has significant overhead in rendering. To save time in rendering, it is known to utilize a "fast-clear" algorithm in which the data in pixels is selectively ignored during pixel data operations, especially if the pixel data is unchanged during rendering of the frames.

Extant fast-clear algorithms typically have a clear bit that indicates if the pixel data is to be ignored in specific pixel data operations. The previous implementations of the fast-clear algorithm require that the same "clear" value be used for all the pixels on the display which have their clear bit set. That is, all pixels that are ignored in a specific pixel data operation must have the same default data value, such as color, intensity, etc. However, some computer graphics applications fill large areas of the display with a gradient, such as a gradient of color or intensity, which changes linearly from one section of the display to another, such as the top of the display screen to the bottom. Existing fast-clear algorithms are not advantageous for use with the gradient display because all of the pixels do not have a common default ("clear") value, and thus, each pixel that is part of the gradient will still require refreshing at each rendering cycle.

It would accordingly be advantageous to provide a system in which a fast fill operation can be used in graphics rendering where an otherwise static gradient can be maintained on a display without needing to fill each pixel of the display per rendering cycle. Such system and method should account for the gradient values in the pixel data, such as color or intensity, while being ignored during the pixel data operations. It is therefore to the provision of such a system and method for providing fast pixel clears in a display having a gradient thereupon that the present invention is primarily directed.

SUMMARY OF THE INVENTION

The present invention is a system and method of maintaining a gradient in a plurality of pixels of a graphics display, where the pixels are filled on the display to create a gradient based upon the coordinates of the pixels and otherwise static data in a pixel is ignored. Examples of a gradient are a color gradient, an intensity gradient, or a depth gradient. The system particularly uses the X coordinate and Y coordinate for each pixel, and the data for each pixel includes a clear bit that indicates if the data of that pixel is ignored in a pixel data operation on the system, and the gradient can be maintained on the display based upon the X or Y coordinate of the pixel, or some combination thereof.

To improve the speed of the fill operation, each pixel in the frame buffer has a fast-clear bit in the respective pixel data. If the fast clear bit is set (either 0 or 1) then the stored pixel data for that pixel is ignored, and "clear" value is used for the data. The present invention thus allows the "clear" value of a pixel to be linearly dependent on the pixels X or Y coordinate on the display so that the gradient values (color, intensity, etc.) can be maintained even though the pixel data was ignored. The present invention can thus be used for color values, or other pixel components, and can also be used to make the clear value be linearly dependent on a combination of the X and Y coordinates.

If the pixel data operation is a read operation, the fast-clear bit must be honored when the pixel is read, either for displaying on the screen, returning pixels to the application, moving pixels, or as part of a read-modify-write or write-update operation. If the pixel data operation is a write operation, the fast-clear bit of that pixel is reset (deactivated) such that a subsequent pixel data operation will not ignore the data of that pixel.

The present invention further includes a method of maintaining a gradient in a plurality of pixels of a display, each pixel having a X coordinate and a Y coordinate and data therefor, comprising the steps of filling the plurality of pixels on a display to create a gradient thereupon, selectively activating a fast-clear bit in the data for each pixel, selectively performing a pixel data operation on one or more of the plurality of pixels of the display, and ignoring pixel data for a pixel with an activated fast-clear bit when performing a pixel data operation. The step of filling the plurality of pixels to create a gradient can be to create a color, intensity, depth, or other gradient on the display.

The present invention therefore provides an advantage in a computer graphics system because the system can render with a fast fill operation and a color, intensity, or other gradient can be maintained on a display without needing to fill each pixel of the display per rendering cycle. The inventive system can advantageously utilize pixel position to calculate the correct pixel value to maintain the gradient and minimize additional overhead for the maintenance of the gradient in ignored pixel data values. Further, the present invention can maintain many types of gradients within the display, such as both a color and intensity gradient, and can maintain each gradient along any dimensional criteria of the pixels, such as top-to-bottom, side-to-side, center-to-edge, or any combination thereof.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
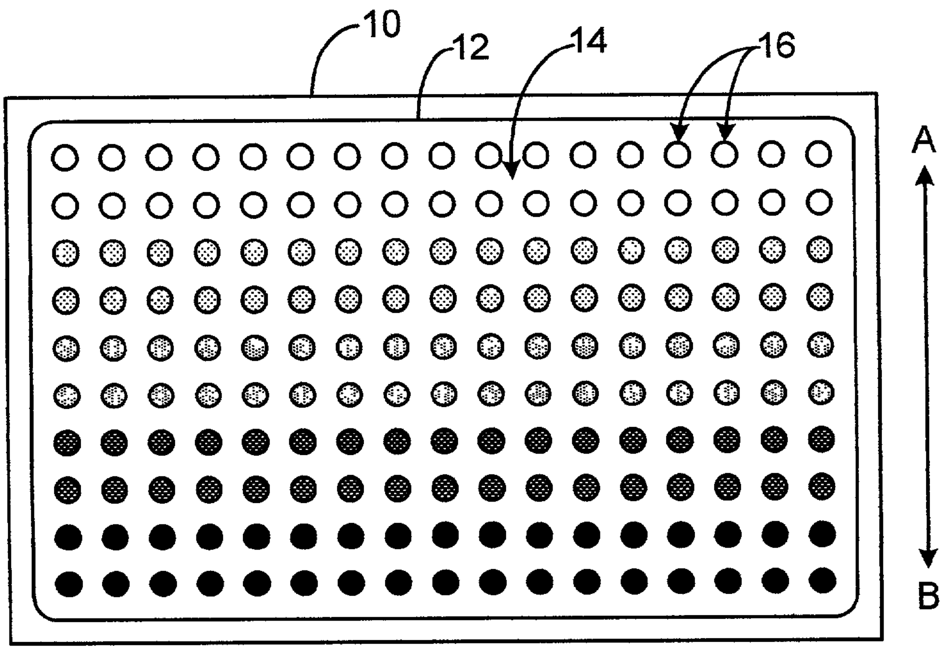
FIG. 1 is a perspective view of a graphics display comprised of a plurality of pixels, and the display has an illuminated color gradient from top-to-bottom.

With reference to the figures in which like numerals represent like elements throughout, FIG. 1 is a perspective view of a computer monitor 10, which is an exemplary graphics display to utilize the present invention. The monitor 10 includes a display screen 12 comprised of a plurality of pixels 16, and the display 12 has an illuminated color gradient 14 from top-to-bottom as shown from the lighter pixels at top of display A to the darker pixels at bottom of screen B. The pixels 16 can include a gradient 14 that varies in color, intensity of the pixel output, depth, hue, flicker, or any visual alteration across the display 12.

Figure 2:
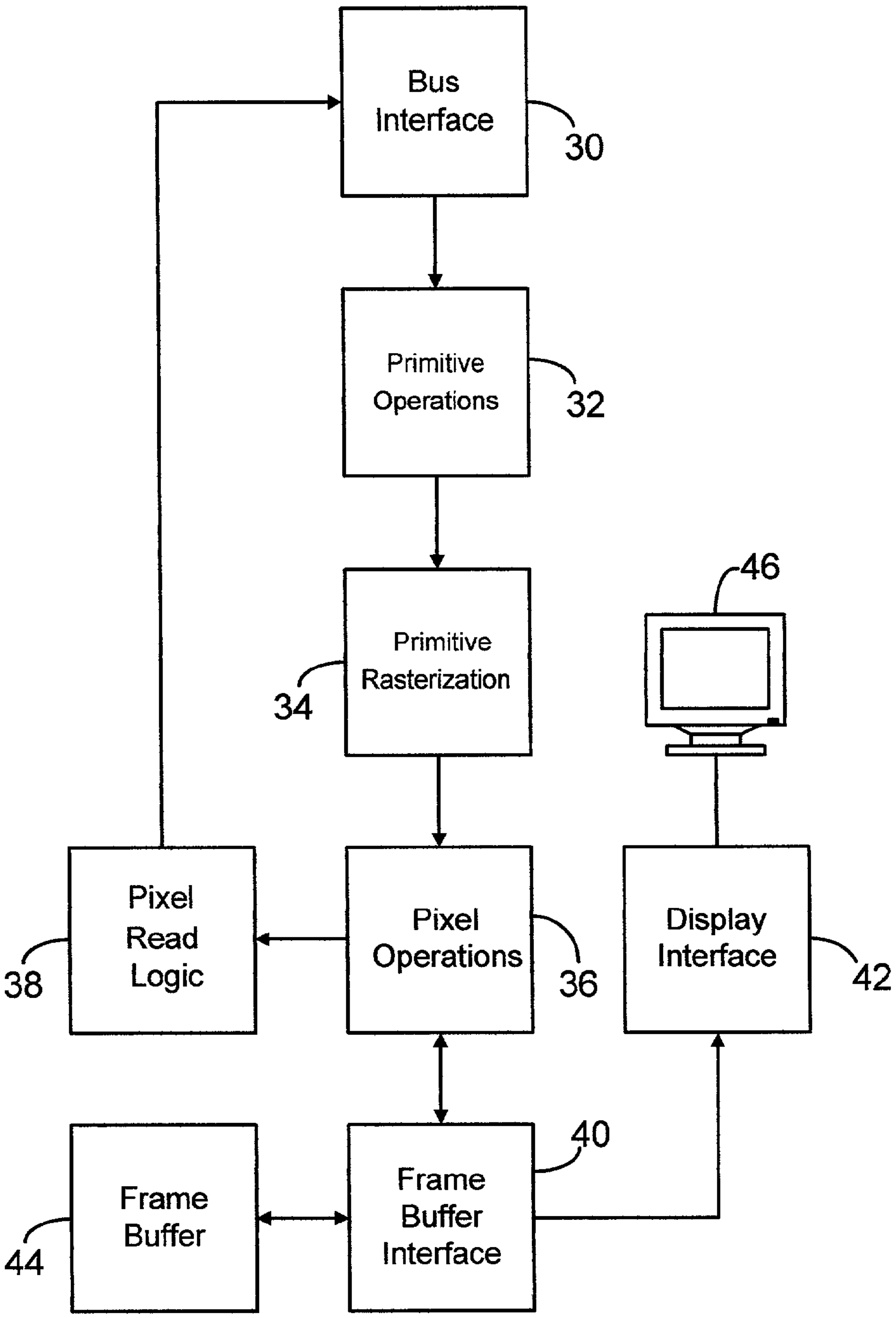
FIG. 2 is a block diagram for a basic computer graphics system that can implement the present invention system and method of maintaining a gradient on the display during a fast-fill rendering.

FIG. 2 is a simplified block diagram for a computer graphics system that includes a bus interface 30, the graphics primitives operations 32 and primitive rasterization 34 as is known in the art. The primitive rasterization 34 computes the clear values for accesses by an application. The computations are done in parallel with calculating the memory addresses from the X and Y coordinates of the pixel 16. The results are sent to the pixel operations 36, which are ultimately translated into pixel read logic 38 for implementation on the display 12. In the present invention, the pixel operations 36 are preferably responsible for substituting the clear values for pixels that have fast-clear bit set as further described herein. The frame buffer interface 40 and frame buffer 44 generate the direct data for use at the display interface 42 for ultimate display on monitor 46. The display interface 42 preferably keeps track of the clear value for the current scan line being rendered on the monitor 46, and also substitutes the clear value for pixels that have fast-clear bit set (activated) to ignore the pixel data.

The inventive graphics display system thus maintains a gradient (color, intensity, and the like) through the utilizing the X coordinate and a Y coordinate for each pixel 16. Each pixel 16 has data, such coordinate and other graphics data, and includes a fast-clear bit. The fast-clear bit indicates if the data of that pixel 16 is ignored in a pixel data operation on the system, such as a read. The fast-clear bit allows the use of a fast-clear algorithm wherein static data for pixels 16 can be ignored during display refreshes. If the fast-clear bit is set or activated, which can be either in an on (1) or off (0) position depending upon system choice, then the pixel data stored for that pixel is ignored, and a "clear" value is used for the data that maintains the gradient(s) present on the display 12. Because the data stored for that pixel is invalid, the fast clear bit must be honored when the pixel is read, either for displaying on the screen, returning pixels to the application, moving pixels, or as part of a read-modify-write or write-update operation, as further described herein.

The present invention allows the "clear" value for the color, intensity, or other value of a pixel to be linearly dependent on the pixels coordinates on the display 12 such that a visual gradient can be maintained without a constant refresh of pixel data. In operation, to maintain a color gradient as example, when a pixel 16 is read from the frame buffer 44 to be displayed, the fast-clear bit is checked to see if the pixel 16 has been cleared. If the fast-clear bit is not set, then the color read from the frame buffer 44 is used to drive the fill for that pixel of the display 12. If the fast-clear bit is set, then the color of the pixel 16 must be computed from a fast-clear register or other data source that computes the fill values for the pixels.

For the top-to-bottom color gradient 14 maintained in FIG. 1, the gradient is maintained by the Y coordinate data for each pixel 16. The fast clear value for a pixel is determined by the following pseudocode:

```
FC_Red=Red_Screen_Base+Max(Screen__Y–
    FC_Window_Origin,0)*Red_Gradient

FC_Green=Green_Screen_Base+Max(Screen__Y–
    FC_Window_Origin,0)*Green_Gradient

FC_Blue=Blue_Screen_Base+Max(Screen__Y–
    FC_Window_Origin,0)*Blue_Gradient
```

The display 12 base color is the color of the pixel 16 at the first visible line of the display 12, or here, the pixels 16 at position A. The gradient 14 then changes as the color of every two rows of pixels increases from the top of the display (position A) to the bottom (position B).

Using a data source, such as registers for the pixel data, at the start of the scan of the display 12 (at position A), the bases for each color are loaded into a data source. The data source holds their value until the scan reaches the first visible line of the display 12, as indicated by the window origin. For each new line after that, the color gradient is added to the contents of the registers. The results are clamped to the (0, 256 color range typically) range and stored back in to the registers. For interlaced displays, the gradient is added twice for each scan line. This method reduces the number of gates needed to compute the color. The present inventive system thus can maintain a gradient based upon the X or Y coordinate, or a combination thereof, as would be understood by one of skill in the art.

Four types of pixel data operations generally can occur when an application or process accesses pixel 16 data. The write-only operation is the simplest. All components of a pixel 16 whose values are affected by the fast-clear bit for that pixel 16 are updated with new values, and the fast-clear bit is deactivated, regardless of the initial state of the fast-clear bit.

A read-only operation does not modify the fast-clear bit within the pixel data. However, the state of the fast-clear bit may affect the pixel data returned by the read-only operation. If the fast-clear bit is set, then the "clear" value is returned instead of the contents of the frame buffer. In essence, if the fast-clear bit is activated, the true resident pixel data value is ignored by the read-only operation.

A read-modify-write operation occurs when the graphics adapter is programmed to use any or all of a pixel data value stored in the frame buffer 44 before the rendering to determine the any or all of the pixel values after the rendering. For example, a drawing function with an XOR operation blends the original color of the pixel 16 with the color sent by the host. The original color is determined by the state of the fast-clear bit. If the fast clear bit is not set, then the value read from the frame buffer 44 is used. If the fast-clear bit is set, then the pixel value is determined by the "clear" value. When the pixel is written, the fast-clear bit is cleared (deactivated).

A write-update operation occurs when some, but not all fast-cleared components of a pixel 16 are changed. For example, an operation may write a new Z coordinate, but not change the color of the pixel. The fast-clear bit is cleared (deactivated), and so the clear value must be written to any fast-cleared components that were not enabled for writing. If these pixel 16 components were not updated with the clear value, then the pixel data value would not be correct to maintain the gradient.

In most cases, drawing, or rendering, uses the display window relative coordinates. Thus, in a color gradient 14 like that shown in FIG. 1, the fast-clear bit value for a pixel 16 is preferably determined by the following equation:

*FC*_Red=Red_Window_Base+/−Window__*Y**Red_Gradient

*FC*_Green=Green_Window_Base+/−Window__*Y**Green_Gradient

*FC*_Blue=Blue_Window_Base+/−Window__*Y**Blue_Gradient

The display window base color is the color at the origin of the window, such as the row of pixels 16 at position A. The gradient 14 is the same value used for displaying, and the progressing +/−value is due to the fact that the window origin may be at the top or the bottom of the window, depending on the specific application programming interface (API). If the origin is at the bottom of the window, then the product of window Y and the gradient are subtracted since window Y increases in the opposite direction of screen Y.

In some cases, the graphics adapter uses screen-relative coordinates to access pixel data. In such circumstances, one preferred pseudocode equation for the clear value is:

*FC*_Red=Red_Screen_Base+Max(Screen__*Y*−*FC*_Window_Origin,0)*Red_Gradient

*FC*_Green=Green_Screen_Base+Max(Screen__*Y*−*FC*_Window_Origin,0)*Green_Gradient

*FC*_Blue=Blue_Screen_Base+Max(Screen__*Y*−*FC*_Window_Origin,0)*Blue_Gradient

Because an application or process can read or write pixels in any arbitrary order, the method for computing the clear value for displaying pixels cannot be used for application accesses. Therefore, the application accesses must implement a multiply.

The fast fill operation involves setting the fast-clear bit for every pixel 16 in the region or display to be filled. The fast-clear bits are preferably stored together in the frame buffer 44, making the operation run quickly. A single write to a word in memory can clear many pixels. However, for any pixel 16 that has its fast-clear bit set, the rest of its associated pixel data are invalid, and must be ignored.

Figure 3:
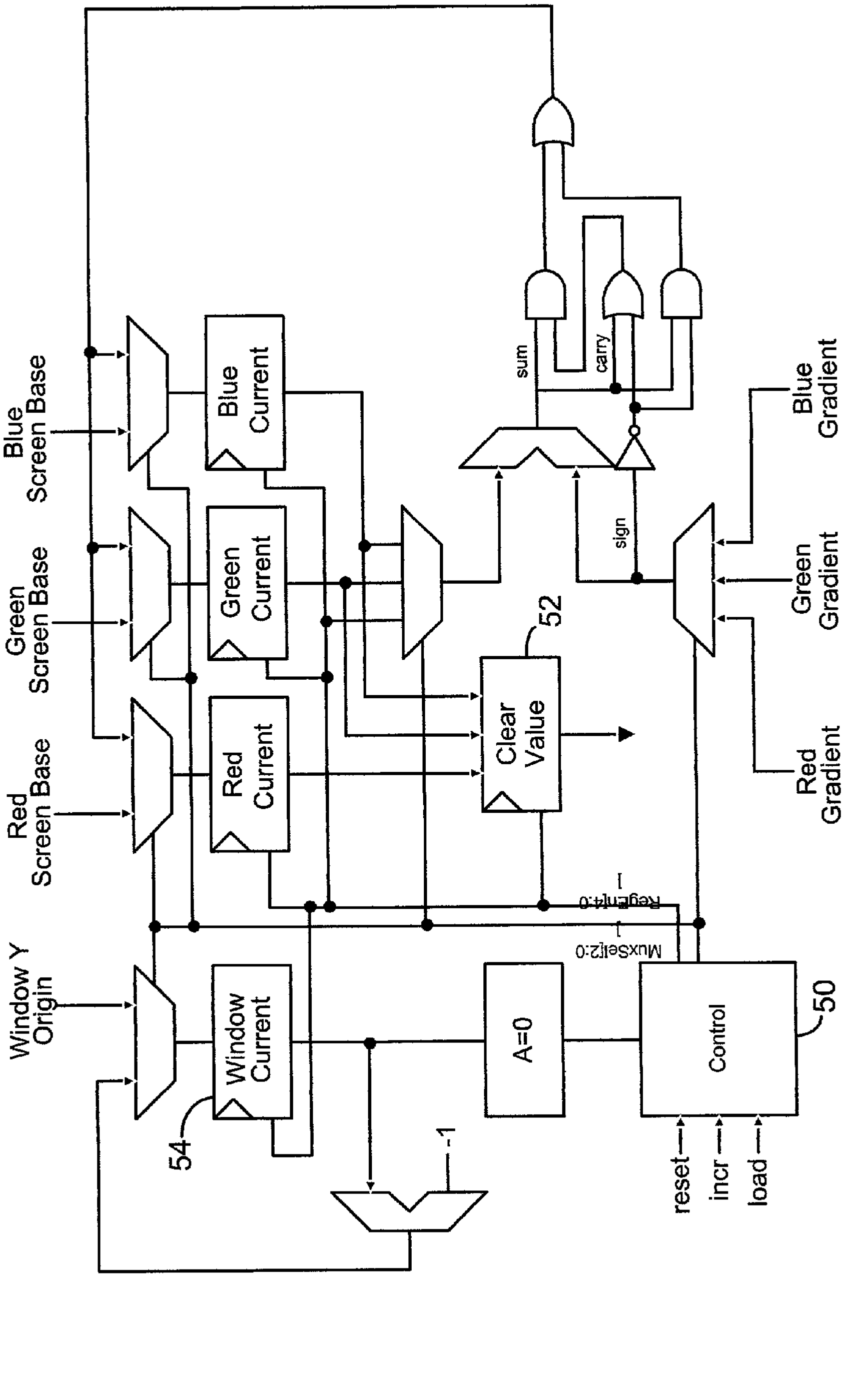
FIG. 3 is a block diagram for the logic calculating the clear value in the display interface of the computer graphics system in FIG. 2.

FIG. 3 is a block diagram of an embodiment of the logic that calculates the clear value in the display interface 42 of FIG. 2. At the start of each frame, the display controller 50 asserts reset. This loads the base values and display 12 origin in to the current pixel data value registers. Before the start of each line, load is asserted. This loads the clear value 52 with the integer portion of each color's current value. At the beginning of each line, incr (increment) is asserted. If the window current register 54 is not zero, it is decremented, and no further action is taken. If the window current register 54 is zero, then each color's current value is added to the gradient. The results are set and stored as the new current value. It is preferred that one color value is processed each clock cycle. And for interlaced displays, incr will be asserted twice at the start of each line.

Figure 4:
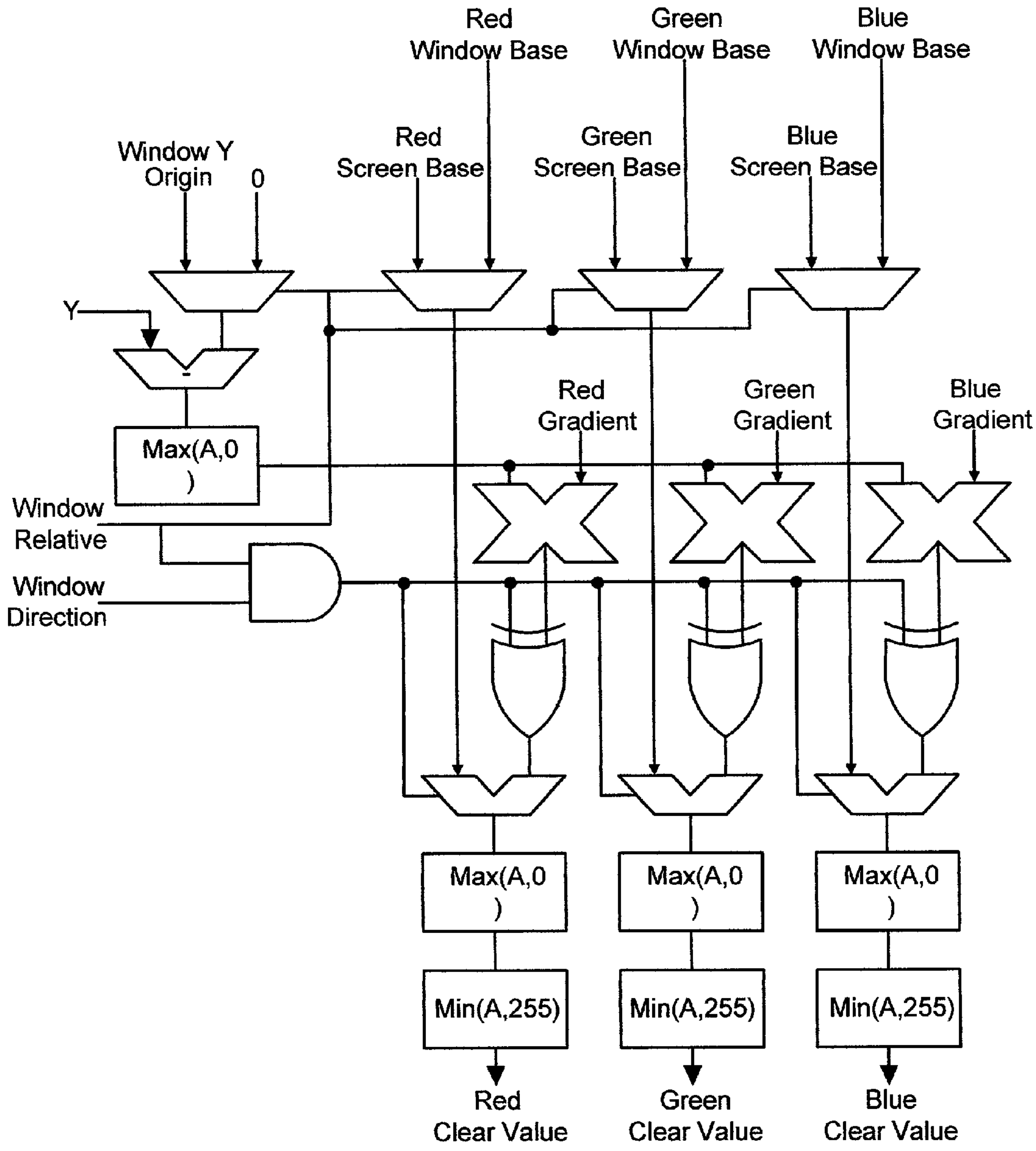
FIG. 4 is a block diagram for the logic calculating the clear value in the primitive rasterizer of the computer graphics system in FIG. 2.

FIG. 4 is a block diagram of one embodiment of a logic circuit that calculates the clear value in the primitive rasterization 34 of FIG. 2. It receives a Y value from the upstream logic, along with the Window Direction and Window Relative bits. Window Direction indicates that the window Y increases in the opposite direction of screen Y. Window Relative asserts that Y is window relative and not screen relative. If Y is not window relative, then the window origin is subtracted from Y. The result is clamped to a minimum of 0, and multiplied by the gradients. The products are added to the screen base colors. If Y is window relative, then the window origin is not subtracted from Y. The products of Y and the gradients are added to or subtracted from the window base colors. If Window Direction is set, then the products are subtracted. The final value for each color is clamped to a value [0,255], and the integer portion is sent to the pixel operations 36 in FIG. 2.

The present invention therefore provides a method of maintaining a gradient in a plurality of pixels 16 of a display 12, each pixel having a X coordinate and a Y coordinate and data therefor, having the steps of filling the plurality of pixels 16 on a display to create a gradient, such as color gradient 14 in FIG. 1, thereupon, then selectively activating a fast-clear bit in the data for each pixel 16, selectively performing a pixel data operation on one or more of the plurality of pixels 16 of the display 12, and ignoring pixel data for a pixel 16 with an activated fast-clear bit when performing a pixel data operation. The step of filling the plurality of pixel 16 to create a gradient can be to create a color gradient, like that shown in FIG. 1, an intensity gradient, a depth gradient, a hue gradient, or a visual gradient on the display 12 that can be caused by any pixel data manipulation.

Further, the step of filing of the plurality of pixels 16 to create a gradient on the display 12 can be creating a gradient based upon the X coordinate or Y coordinate data for each pixel 16, or some combination thereof. The gradient can be a top-to-bottom gradient, such as shown in FIG. 1, or a bottom-to-top, side-to-side, center-to-edge, or localized gradient on the display 12.

The step of selectively performing a pixel data operation can be a write operation, and then the method can include the step of, upon a write-operation of data to a pixel 16, deactivating the fast-clear bit of that pixel such that a subsequent pixel data operation will not ignore the data of that pixel 16. The step of selectively performing a pixel data operation could alternately be performing a read-operation, and then the method includes the step of, upon a read-operation of data to a pixel 16, ignoring the pixel data in response to the read-operation if the fast-clear bit of that pixel 16 is activated.

The step of selectively performing a pixel data operation can be performing a read-modify-write operation, the method will then include the steps of, upon the read portion of the pixel data operation to a pixel 16, ignoring the pixel data in response to the read operation if the fast-clear bit of that pixel is activated, and deactivating the fast-clear bit of that pixel such that a subsequent pixel data operation will not ignore the data of that pixel. And if the step of selectively performing a pixel data operation is performing a write-update operation in which some of the data of a pixel 16 is written to, and the method includes the step of, upon a write-update operation of data to a pixel 16, if the update data affects the pixel data coordinate (X, Y, or combination) for the gradient on the display, then deactivating the fast-clear bit of that pixel such that a subsequent pixel data operation will not ignore the data of that pixel 16.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. A graphics display system comprising a display including a plurality of pixels, each pixel having a X coordinate and a Y coordinate and data therefore wherein the plurality of pixels generate a gradient on the display, and the data for each pixel including a fast-clear bit that indicates if the data of that pixel is ignored in a pixel data operation on the system, wherein if the pixel data is ignored, a clear value of the pixel is used to maintain the gradient on the display without a constant refresh of the pixel data, wherein the clear value is dependent on at least one coordinate of the pixel.

2. The system of claim 1, wherein the gradient is maintained by the Y coordinate data for each pixel.

3. The system of claim 1, wherein the gradient is maintained by the X coordinate data for each pixel.

4. The system of claim 1, wherein the gradient is maintained by a combination of X coordinate data and Y coordinate data for each pixel.

5. A graphics display system comprising a display including a plurality of pixels, each pixel having a X coordinate and a Y coordinate and data therefore wherein the plurality of pixels generate a gradient on the display, and the data for each pixel including a fast-clear bit that indicates if the data of that pixel is ignored in a pixel data operation on the system, and if the data for a pixel is ignored in a pixel data operation, that pixel retaining pixel data such that the gradient is maintained on the display;

wherein the pixel data operation is a write operation, and upon a write operation of data to a pixel, the fast-clear bit of that pixel is reset such that a subsequent pixel data operation will not ignore the data of that pixel.

6. A graphics display system comprising a display including a plurality of pixels, each pixel having a X coordinate and a Y coordinate and data therefore wherein the plurality of pixels generate a gradient on the display, and the data for each pixel including a fast-clear bit that indicates if the data of that pixel is ignored in a pixel data operation on the system, and if the data for a pixel is ignored in a pixel data operation, that pixel retaining pixel data such that the gradient is maintained on the display;

wherein the pixel data operation is a read operation, and upon a read operation of data to a pixel, if the fast-clear bit of that pixel indicates that the pixel data is to be ignored, the pixel data is ignored in response to the read operation.

7. A graphics display system comprising a display including a plurality of pixels, each pixel having a X coordinate and a Y coordinate and data therefore wherein the plurality of pixels generate a gradient on the display, and the data for each pixel including a fast-clear bit that indicates if the data of that pixel is ignored in a pixel data operation on the system, and if the data for a pixel is ignored in a pixel data operation, that pixel retaining pixel data such that the gradient is maintained on the display;

wherein the pixel data operation is a read-modify-write operation, upon the read portion of the pixel data operation to a pixel, if the fast-clear bit of that pixel indicates that the pixel data is to be ignored, the pixel data is ignored in response to the read portion and then the fast-clear bit of that pixel is reset such that a subsequent pixel data operation will not ignore the data of that pixel.

8. A graphics display system comprising a display including a plurality of pixels, each pixel having a X coordinate and a Y coordinate and data therefore wherein the plurality of pixels generate a gradient on the display, and the data for each pixel including a fast-clear bit that indicates if the data of that pixel is ignored in a pixel data operation on the system, and if the data for a pixel is ignored in a pixel data operation, that pixel retaining pixel data such that the gradient is maintained on the display;

wherein the pixel data operation is a write-update operation in which some of the data of a pixel is written to, upon a write-update operation of data to a pixel, and if the update data affects the pixel data coordinate for a color gradient in the display, then the fast-clear bit of that pixel is reset such that a subsequent pixel data operation will not ignore the data of that pixel.

9. The system of claim 1, wherein the plurality of pixels maintains a color gradient on the display.

10. The system of claim 1, wherein the plurality of pixels maintains an intensity gradient on the display.

11. A graphics display system comprising a display including a plurality of pixels, each pixel having a means for maintaining a gradient on the display while otherwise allowing fast clears of pixel data, by using a clear value to maintain the gradient on the display without a constant refresh of the pixel data when the pixel data for a pixel is ignored.

12. A method of maintaining a gradient in a plurality of pixels of a display, each pixel having a X coordinate and a Y coordinate and data therefore, the method comprising the steps of: filling the plurality of pixels on a display to create a gradient thereupon;

selectively activating a fast-clear bit in the data for each pixel;

selectively performing a pixel data operation on one or more of the plurality of pixels of the display; and ignoring pixel data for a pixel with an activated fast-clear bit when performing a pixel data operation;

wherein if the pixel data is ignored, a clear value of the pixel is used to maintain the gradient on the display without a constant refresh of the pixel data, wherein the clear value is dependent on at least one coordinate of the pixel.

13. The method of claim 12, wherein the step of filing of the pixels to create a gradient on the display is creating the gradient based upon Y coordinate data for each pixel.

14. The method of claim 12, wherein the step of filing of the pixels to create a gradient on the display is creating the gradient based upon X coordinate data for each pixel.

15. The method of claim 12, wherein the step of filing of the pixels to create a gradient on the display is creating the gradient based upon a combination of X coordinate and Y coordinate data for each pixel.

16. A method of maintaining a gradient in a plurality of pixels of a display, each pixel having a X coordinate and a Y coordinate and data therefore, the method comprising the steps of: filling the plurality of pixels on a display to create a gradient thereupon;

selectively activating a fast-clear bit in the data for each pixel;

selectively performing a pixel data operation on one or more of the plurality of pixels of the display; and ignoring pixel data for a pixel with an activated fast-clear bit when performing a pixel data operation;

wherein the step of selectively performing a pixel data operation is performing a write operation, and further comprising the step of, upon a write operation of data to a pixel, deactivating the fast-clear bit of that pixel such that a subsequent pixel data operation will not ignore the data of that pixel.

17. A method of maintaining a gradient in a plurality of pixels of a display, each pixel having a X coordinate and a Y coordinate and data therefore, the method comprising the steps of: filling the plurality of pixels on a display to create a gradient thereupon;

selectively activating a fast-clear bit in the data for each pixel;

selectively performing a pixel data operation on one or more of the plurality of pixels of the display; and ignoring pixel data for a pixel with an activated fast-clear bit when performing a pixel data operation;

wherein the step of selectively performing a pixel data operation is performing a read operation, and further comprising the step of, upon a read operation of data to a pixel, ignoring the pixel data in response to the read operation if the fast-clear bit of that pixel is activated.

18. A method of maintaining a gradient in a plurality of pixels of a display, each pixel having a X coordinate and a Y coordinate and data therefore, the method comprising the steps of: filling the plurality of pixels on a display to create a gradient thereupon;

selectively activating a fast-clear bit in the data for each pixel;

selectively performing a pixel data operation on one or more of the plurality of pixels of the display; and ignoring pixel data for a pixel with an activated fast-clear bit when performing a pixel data operation;

wherein the step of selectively performing a pixel data operation is performing a read-modify-write operation, and further comprising the steps of:

upon the read portion of the pixel data operation to a pixel, ignoring the pixel data in response to the read operation if the fast-clear bit of that pixel is activated; and deactivating the fast-clear bit of that pixel such that a subsequent pixel data operation will not ignore the data of that pixel.

19. A method of maintaining a gradient in a plurality of pixels of a display, each pixel having a X coordinate and a Y coordinate and data therefore, the method comprising the steps of: filling the plurality of pixels on a display to create a gradient thereupon;

selectively activating a fast-clear bit in the data for each pixel;

selectively performing a pixel data operation on one or more of the plurality of pixels of the display; and ignoring pixel data for a pixel with an activated fast-clear bit when performing a pixel data operation;

wherein the step of selectively performing a pixel data operation is performing a write-update operation in which some of the data of a pixel is written to, and further comprising the step of, upon a write-update operation of data to a pixel, if the update data affects the pixel data coordinate for the gradient on the display, then deactivating the fast-clear bit of that pixel such that a subsequent pixel data operation will not ignore the data of that pixel.

20. The method of claim 12, wherein the step of filling the plurality of pixels is filling the plurality of pixels to create a color gradient on the display.

* * * * *